United States Patent [19]
Hawkins

[11] Patent Number: 6,119,233
[45] Date of Patent: Sep. 12, 2000

[54] SECURE DATA COMMUNICATION SYSTEM

[76] Inventor: Charles C. Hawkins, 2501 Fair Oaks, St. Charles, Mo. 63301

[21] Appl. No.: 08/856,655

[22] Filed: May 15, 1997

[51] Int. Cl.[7] ....................................................... H04L 9/00
[52] U.S. Cl. ............................................................ 713/201
[58] Field of Search ................................... 713/200, 201; 379/93.24, 88.13, 100.8, 100.9, 209, 93.2, 93.3

[56] References Cited

U.S. PATENT DOCUMENTS

| | | | |
|---|---|---|---|
| 4,876,717 | 10/1989 | Barron et al. | 380/25 |
| 5,333,152 | 7/1994 | Wilber | 379/98 |
| 5,369,686 | 11/1994 | Dutra et al. | 379/93.24 |
| 5,379,340 | 1/1995 | Overend et al. | 379/93.24 |
| 5,436,960 | 7/1995 | Campana, Jr. | 379/58 |
| 5,440,618 | 8/1995 | Riegel et al. | 379/95 |
| 5,483,352 | 1/1996 | Fukuyama et al. | 358/402 |
| 5,583,658 | 12/1996 | Takezawa et al. | 358/440 |
| 5,836,010 | 11/1998 | Kim et al. | 713/200 |
| 5,844,970 | 12/1998 | Hsu et al. | 379/93.24 |
| 5,872,841 | 2/1999 | King et al. | 379/209 |
| 5,909,215 | 6/1999 | Berstis et al. | 379/209 |
| 5,909,487 | 6/1999 | Mainker et al. | 345/340 |
| 5,940,751 | 8/1999 | Kaplan et al. | 455/411 |

OTHER PUBLICATIONS

Simmons, Gustavus. "How to (Selectively) Broadcast a Secret" Proceedings of the 1985 Symposium on Security and Privacy, IEEE 1985, pp. 108–113, Apr. 1985.

Horback, Glen. "Callback Security Unit Protects Switched Data Communications Systems" Computer Technology Review, Fall 1985, pp. 25–31, Sep. 1985.

Lahti, B.P. Modern Digital Communication System, Oxford University Press. Oxford, England 1998 p. 368, 421–2, 432, May 1998.

Smith, Jim. "Call–back schemes ward off unwanted acces by telephone" Electronics. Mar. 8, 1984, pp. 131–135.

Primary Examiner—Robert W. Beausoliel, Jr.
Assistant Examiner—Bryce Bonzo
Attorney, Agent, or Firm—Grace J. Fishel

[57] ABSTRACT

A secure data communication system is shown for transferring digital data from one computer directly to another. The system includes specially adapted switches interconnected by high bandwidth private data lines. Subscribers use low cost, highly specialized computer mailboxes that connect to the switches over the public telephone network and are connected to subscribers' computers. Each mailbox has a unique identification number burned on a PROM located therein. Switches verify the identification of a mailbox both through the unique identification number and by a series of callbacks to the mailbox's registered telephone number to ensure that the mailbox is properly located. A network scheduler receives pending transaction requests and calculates a time when the sending and receiving mailbox are both available for the transfer. The data may be compressed and/or encrypted during the transfer.

42 Claims, 5 Drawing Sheets

SECURE DATA COMMUNICATION SYSTEM

FIELD OF THE INVENTION

The present invention relates to a data communication system, and more particularly to a system to securely transfer binary data between computers.

BACKGROUND OF THE INVENTION

It is often desirable in business today to transfer information from one location to another, whether the information be a document, sound, pictures, or video. Today most forms of information can be digitized. Digitized information is a representation of the original information in the form of binary data—a sequence of 1's and 0's. Information must be generally be in digitized format to be useable by computers or just about any form of electronics equipment.

However, telephones by themselves can only transfer information in analog (non-digital) form. To transfer digital information over telephone lines, the information must be converted to analog form, transmitted, and converted back to digital form. Converting information back and forth between analog and digital form causes distortion which is compounded when converted multiple times. Additionally, saving the analog information that comes over the telephone and digitizing it is a cumbersome task.

Facsimile machines can simplify the transfer of documents. They can not, however, transfer sound or video. Additionally, it is usually desirable for several reasons, including the ability to edit the document, to receive a document in a specific digital form readable by a word processor, generally a format known as ASCII. Facsimile machines are not capable of doing this without the aid of optical character recognition (OCR) software. OCR software is notoriously unreliable in converting facsimiles into ASCII or similar formats, thus necessitating time spent in "cleaning up" the converted document. Even then, formatting codes used by word processors are lost in the process.

Modems are capable of transferring digital information directly from one computer to another over analog telephone lines. However, modems must either be answered manually when a call from another modem arrives, which is inconvenient, or they must be left on auto-answer which leaves the computer and any network attached thereto vulnerable to attacks by hackers. Furthermore, to transfer information by modem, a time must be found when both the sender's modem and recipient's modem are idle.

The Internet, which is a global network of computers, has facilitated the transfer of digital information which overcomes many of the limitations mentioned above. On the other hand, a dedicated connection to the Internet leaves a computer vulnerable to attacks by hackers. The information transferred passes through several computers on several smaller subnetworks en route, thereby leaving it vulnerable to eavesdropping by others. Additionally, electronic mail ("e-mail") sent over the Internet, can often sit on a computer of a third party for significant periods of time (depending on how often a user retrieves his or her e-mail) during which it is vulnerable to eavesdropping or modification.

Companies can setup private networks using high bandwidth leased lines. The shortcomings of this method include both the high cost of leasing the lines, and the inability to securely transfer data to anyone who is not on the private network.

U.S. Pat. No. 5,440,618 to Riegel et al. teaches the use of computers preprogrammed with a telephone number of a remote monitoring computer. When the remote monitoring computer needs data from the preprogrammed computers, it places a call to the preprogrammed computer over a secure network. In response thereto, the preprogrammed computer calls the monitoring computer over the public telephone network at the telephone number with which it has been preprogrammed. This method does not provide for transferring data to anyone, but a single user at a predetermined location. It also does not allow data to be transferred bidirectionally.

It is therefore an object of the present invention to provide a means of securely transferring binary data from one computer to any number of other computers over the public telephone network.

It is a further object of the present invention to provide a system of transferring binary data over a public telephone network with a means of controlling the traffic flow.

It is yet a further object of the present invention to provide such a system, which is impervious to hacking, eavesdropping, and identity spoofing.

Other objects of the invention will become apparent from the specification described herein below.

SUMMARY OF THE INVENTION

In accordance with the objects listed above, the present invention is a secure data communication system. The system in its most basic form comprises an electronic switching system that transfers digital (binary) data directly from one computer to another using, at least in part, the public telephone network.

The system includes at least one switch, however the system will become more versatile, the more switches that are added thereto. The switches are modified slightly from the type ordinarily used in the public telephone network. They are interconnected using private leased lines, such as T-1 data lines or satellite links.

Each subscriber (user) of the system also has a mailbox. The mailbox is a specialized, low cost, computer. It includes a processor, memory, storage, a modem, and an interface to the user's personal computers. Each mailbox also has, stored in non-volatile memory, the telephone number of a local switch, and an identification number unique to that mailbox. The unique identification number is preferably permanently burned into a programmable read only memory chip ("PROM").

Each switch is connected to a controller computer. The controller computer, in addition to controlling all of the functions of the switch connected thereto, maintains a lookup table of subscribers' telephone numbers, indexed by the unique identification numbers of their mailboxes. In a system utilizing more than one switch, the controller also communicates with a network scheduler.

The network scheduler is another computer, which serves to control network traffic. Only one network scheduler is needed. However, in a very large system, multiple network schedulers may increase efficiency.

In operation, a sending subscriber uses a personal computer connected to his mailbox. On the personal computer is digital data which he wishes to transfer to a receiving subscriber. The digital data and the address of the recipient are sent to the subscriber's mailbox. The mailbox adds a header containing information about the transaction (e.g., data to be transferred and the destination) and calls the local switch at the number preprogrammed therein.

After the mailbox calls the local switch and identifies itself, it disconnects. The switch verifies the identification of the contacting mailbox and calls back at the registered telephone number for that mailbox. The mailbox then transfers the header containing the information about the transaction and disconnects once again. The switch notifies the network scheduler of the pending transaction via the controller.

The network scheduler determines a time when both sending and receiving mailboxes are available for transfer and stores the information in its database. The network scheduler then notifies the local switches, for both the sending and receiving mailboxes, of the transfer time.

At the appropriate time, the switches call the sending and receiving mailboxes to verify their respective abilities to send and receive the data. The switches disconnect and the mailboxes call back the switches. Again, the identification numbers of the mailboxes are verified. The data is then transferred directly from the sending mailbox to the receiving mailbox via the interconnected switches.

The data is preferably compressed and encrypted by the sending mailbox, and uncompressed and decrypted by the receiving mailbox. After receiving the data, the mailboxes disconnect and the transaction is completed. The receiving mailbox notifies the receiving subscriber that an incoming transfer has arrived. Means may also be provided to ensure only authorized users access the mailbox.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein.

DETAILED DESCRIPTION OF THE DRAWINGS

Figure 1:
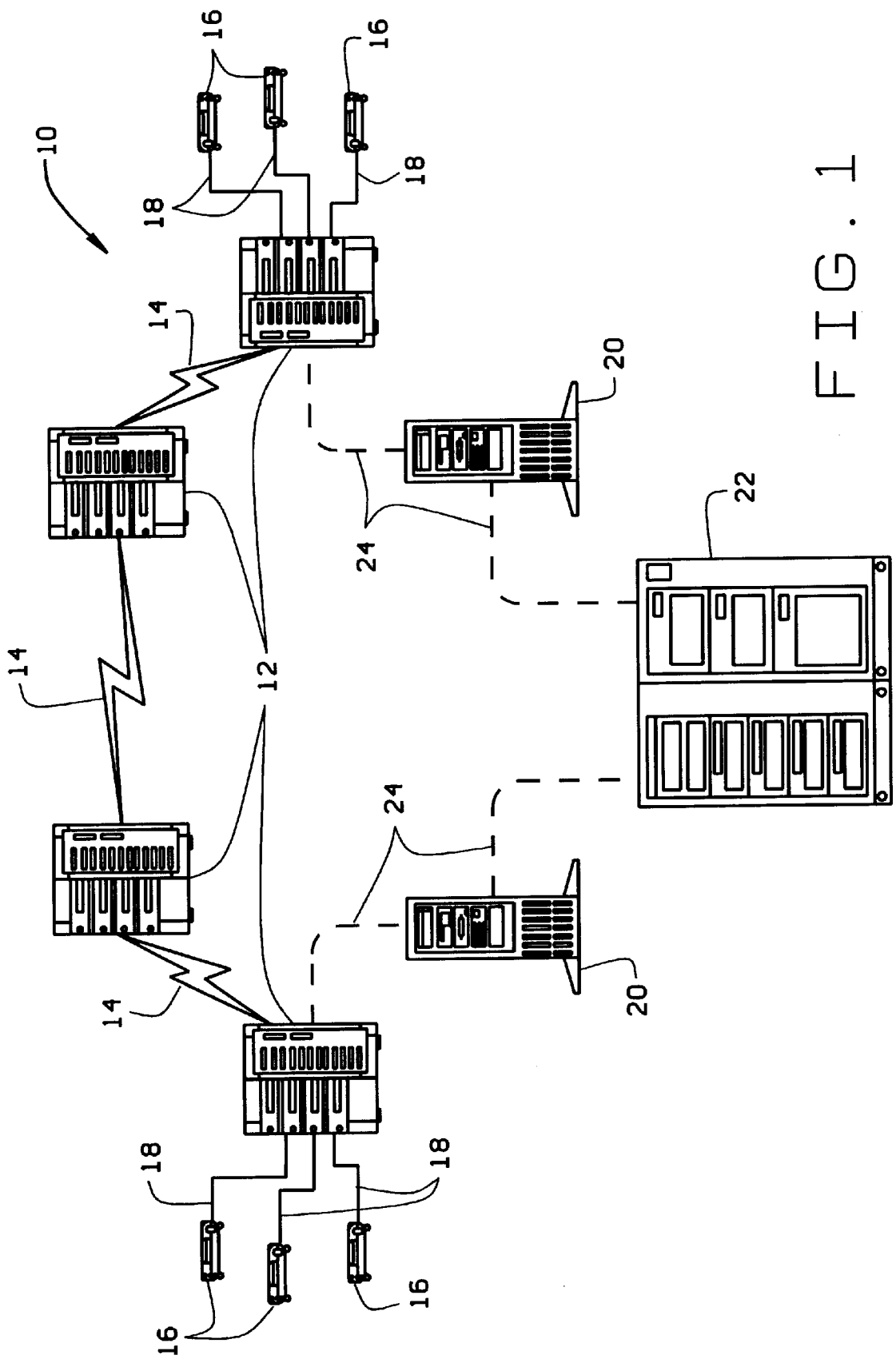
FIG. 1 is a diagram of the present secure data communication system showing the relationship of the various components.

Referring now to FIG. 1, a diagram of a secure data communication system 10 is shown generally. The system primarily comprises a plurality of switches 12 interconnected by high bandwidth digital lines 14, though the system 10 may theoretically operate with only one switch 12 as will become apparent. Connected to the switches 12 through the public telephone lines 18, are a plurality of subscribers' mailboxes 16.

Each switch 12 with mailboxes 16 connected thereto should also have a controller computer 20 connected thereto. The controller computers 20 are in turn connected to a network scheduler 22 which is responsible for traffic control on the system 10. The network scheduler 22, the controller computers 20, and the switches 12 may be connected using lower bandwidth lines 24 than the high bandwidth digital lines 14 used to interconnect the switches 12. The high bandwidth digital lines 14, may be physical lines or virtual connections using satellites or similar means. The interoperation of the components will be explained below.

Figure 2:
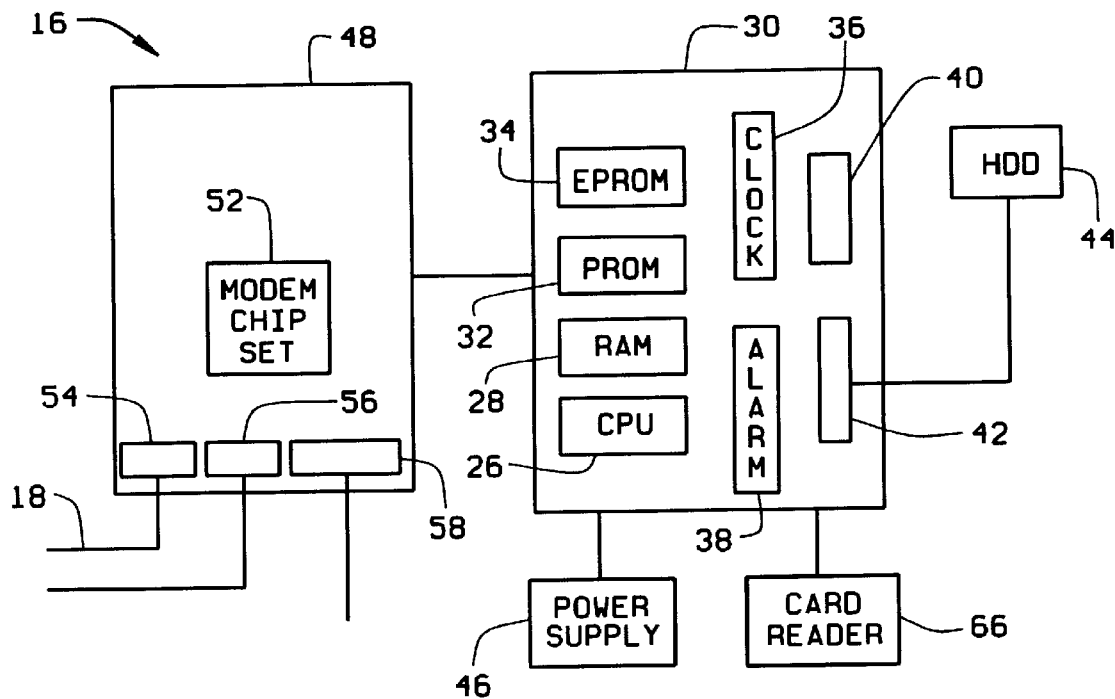
FIG. 2 is a diagram of the preferred embodiment of a subscriber's mailbox computer for the gent secure data communications system.

The mailboxes 16 are specially modified computers. The mailboxes 16 have very specific tasks, and therefore have very specific requirements which allow them to be made inexpensively. The components of the preferred embodiment of the mailbox 16 are shown in FIG. 2. The mailbox 16 has a central processing unit ("CPU") 26 located on a system board 30. The CPU 26 may be any one of a number of CPUs available commercially today. In the preferred embodiment, the CPU 26 is a 32-bit reduced instruction set chip ("RISC") processor. It is also preferable for security reasons, that the CPU 26 design be modified to contain a limited subset of instructions containing only those instructions needed for the present application.

Connected to the CPU 26 on the system board 30 is enough random access memory ("RAM") 28 necessary for the CPU 26 to perform its operations. Also located on the system board is a PROM 32. The PROM 32 contains a unique identification number for the mailbox 16. The unique identification number is burned in at the time of manufacture and no two mailboxes 16 will have the same number. The PROM 32 is accompanied by an erasable PROM ("EPROM") 34. The EPROM 34 contains the firmware operating system for the mailbox 16 and may also contain telephone numbers for local switches 12. The telephone numbers may alternatively be stored on a "smart card" (not shown) which will be described later. The "smart card" is the preferred location for the telephone number in embodiments incorporating the "smart cards."

A clock 36 and alarm 38 are also provided on the system board 30 to facilitate time functions for the mailbox 16. A hard disk drive ("HDD") controller 40 is also located on the system board 30 along with an HDD interface 42. The HDD 44 may be external to the system board 30. The HDD 44 and its controller 40 and interface 42 may be of any conventional type, such as the "integrated drive electronics" ("IDE") standard. The size of the HDD 44 may vary depending on the need of the subscriber. The HDD 44 must be large enough to store outbound data until it is transferred, and inbound data until it is transferred from the mailbox 16 to the receiving subscriber's personal computer 50. Typically, an HDD 44 between 500 megabytes and a gigabyte will typical.

The mailbox 16 is powered by a power supply 46 that is preferably external to the body of the mailbox 16. This facilitates the manufacturing of a single mailbox 16 useable in a variety of countries with differing AC power standards.

The mailbox 16 also has an internal modem 48 attached to the system board 30. The modem 48 may be integrated directly into the system board 30, however it is advantageous to keep it separate so that the it may be replaced as faster modem technology become available. The modem 48 uses a standard modem chip set 52. The modem 48 has two RJ-11 jacks (the jacks may be replaced with types compatible with standards in other countries). One of the jacks is an incoming jack 54 which is connected to the subscriber's telephone line 18. The other jack is an optional auxiliary jack 56, which may be connected to a facsimile machine (not shown) so that the subscriber may share a telephone line between the mailbox 16 and a facsimile machine.

Figure 3:
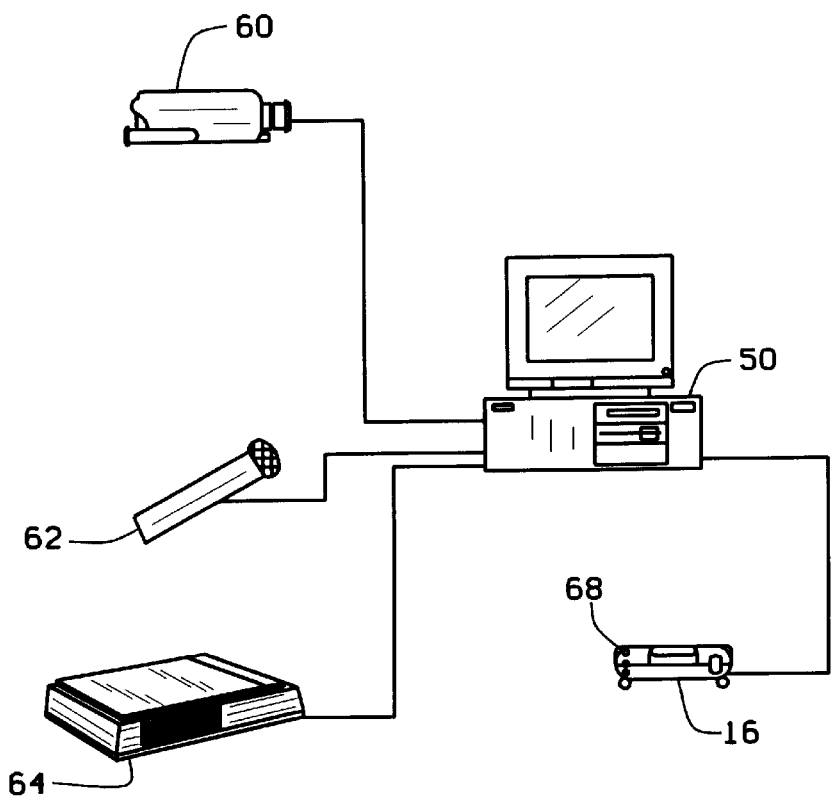
FIG. 3 is a logical representation of various input means for the present secure data communication system.

Turning now to FIG. 3, attatched to either the modem 48 or the system board 30 is an interface 58 for the subscriber's personal computer 50. The interface 58 may use any design known in the art, though it is preferable to use an RS232C standard interface for compatibility reasons. As other interface standards evolve and gain widespread acceptance, the interface 58 should be appropriately replaced. A front end software application should be used to facilitate a user-friendly environment for the subscriber. Optionally, virus detection software may be integrated therein. The front end software should be simple and should allow the subscriber to transfer digital data from any media to the mailbox 16, requiring only the entry of the recipient's identification. Exemplary media include video 60 digitized using a video capture board, audio 62 digitized using a sound card, scanned pictures using a scanner 64, or any other type of data or application file already found on the subscriber's personal computer 50.

For security purposes, means for preventing unauthorized use may be added to the mailbox 16. One possible method is to include a key activated switch on the mailbox 16. Only with the key in place will the mailbox 16 accept outgoing data or release incoming data to a subscriber's personal computer 50. The preferred method at this time is the use of "smart cards". The "smart cards" are credit-card-sized with a microchip embedded therein. To incorporate the preferred method, the mailbox 16 must have a card reader 66 integrated therewith. It is contemplated when the technology becomes less expensive to make its use practical, that finger print scanning may be used to prevent unauthorized use.

When "smart cards" are used, a separate identification number may be provided for each user of a mailbox 16, thus allowing multiple subscribers to share the same mailbox 16. Furthermore, the telephone numbers for the switches 12 may be stored on the smart card, rather than in the EPROM 34, thereby alleviating the need for any significant modification to a mailbox 16 before being shipped to the subscriber.

In operation, a mailbox 16 of the preferred embodiment is distributed to a subscriber or a group of subscribers located together. The mailbox 16 is accompanied by a number of "smart cards" equal to the number of subscribers that will be sharing the mailbox 16, the "smart cards" having the telephone number to a local switched already entered on the card. To initiate setup, the subscriber enters his "smart card" into the card reader 66, and then enters his name using the front end software and optionally a password to be used by the software thereafter. If the subscriber is the first subscriber to use this particular mailbox 16, he also enters the telephone number where the mailbox 16 may be reached by the switch 12. After all "smart cards" have been registered with the mailbox 16, the mailbox 16 calls the local switch 12, identifies itself and registers its telephone number, and a list of valid identification numbers for its subscribers. The controller computer 20 for the switch then stores this information in a database. At this point, the mailbox 16 is ready for use.

Figure 4A:
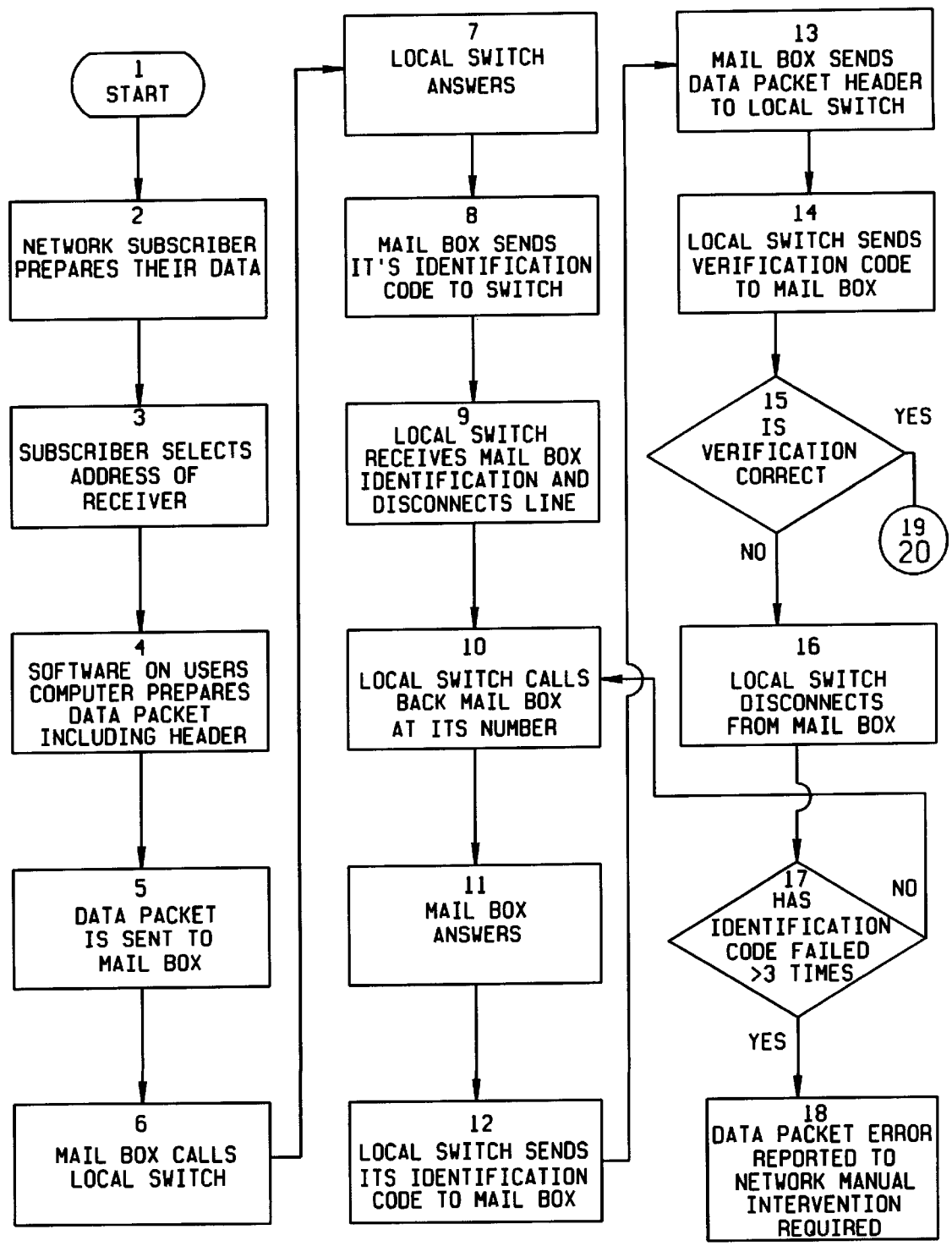
FIGS. 4A–4C constitute a flow chart showing the operation of the present secure data communication system.
Figure 4B:
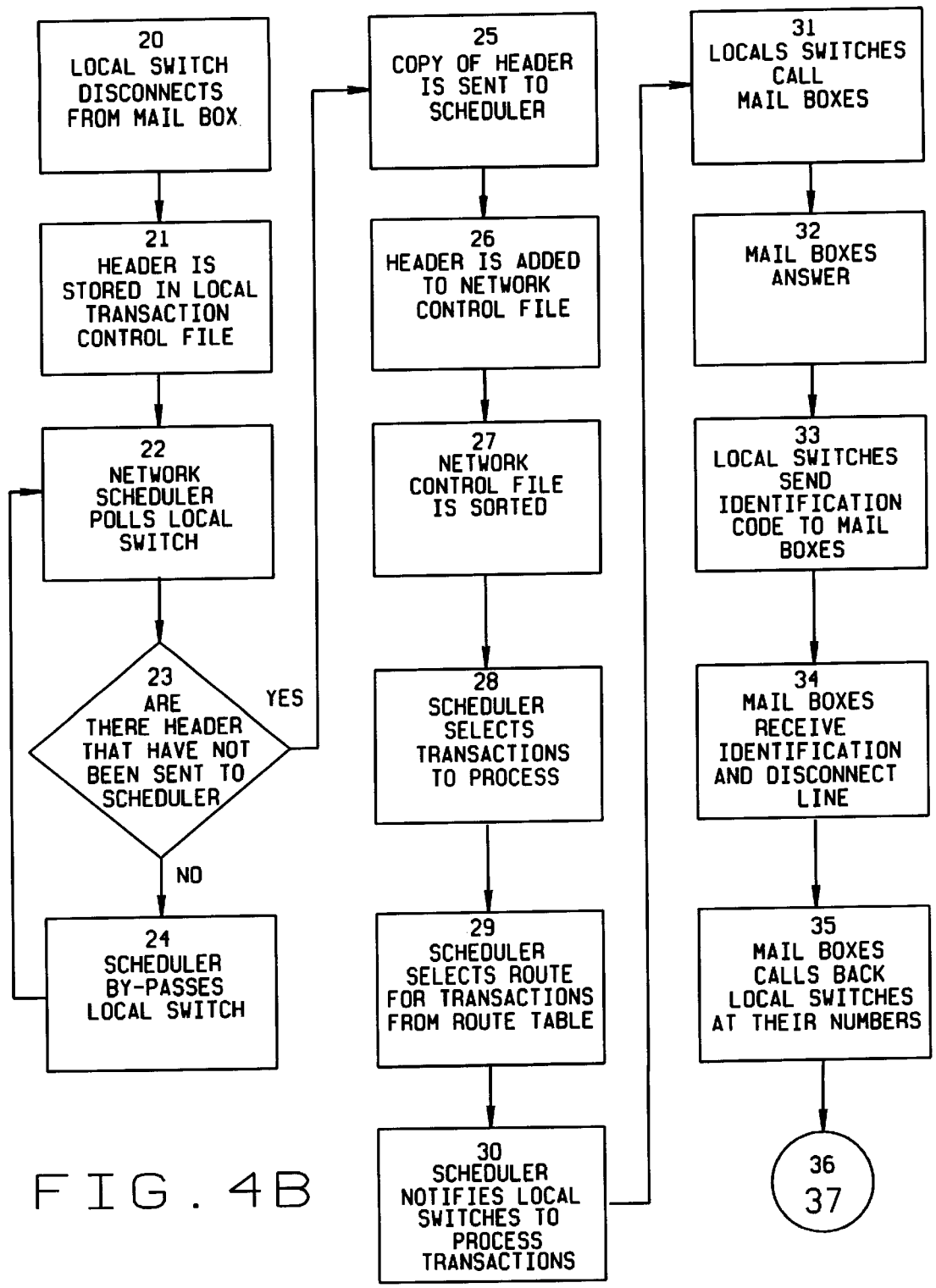
Figure 4C:
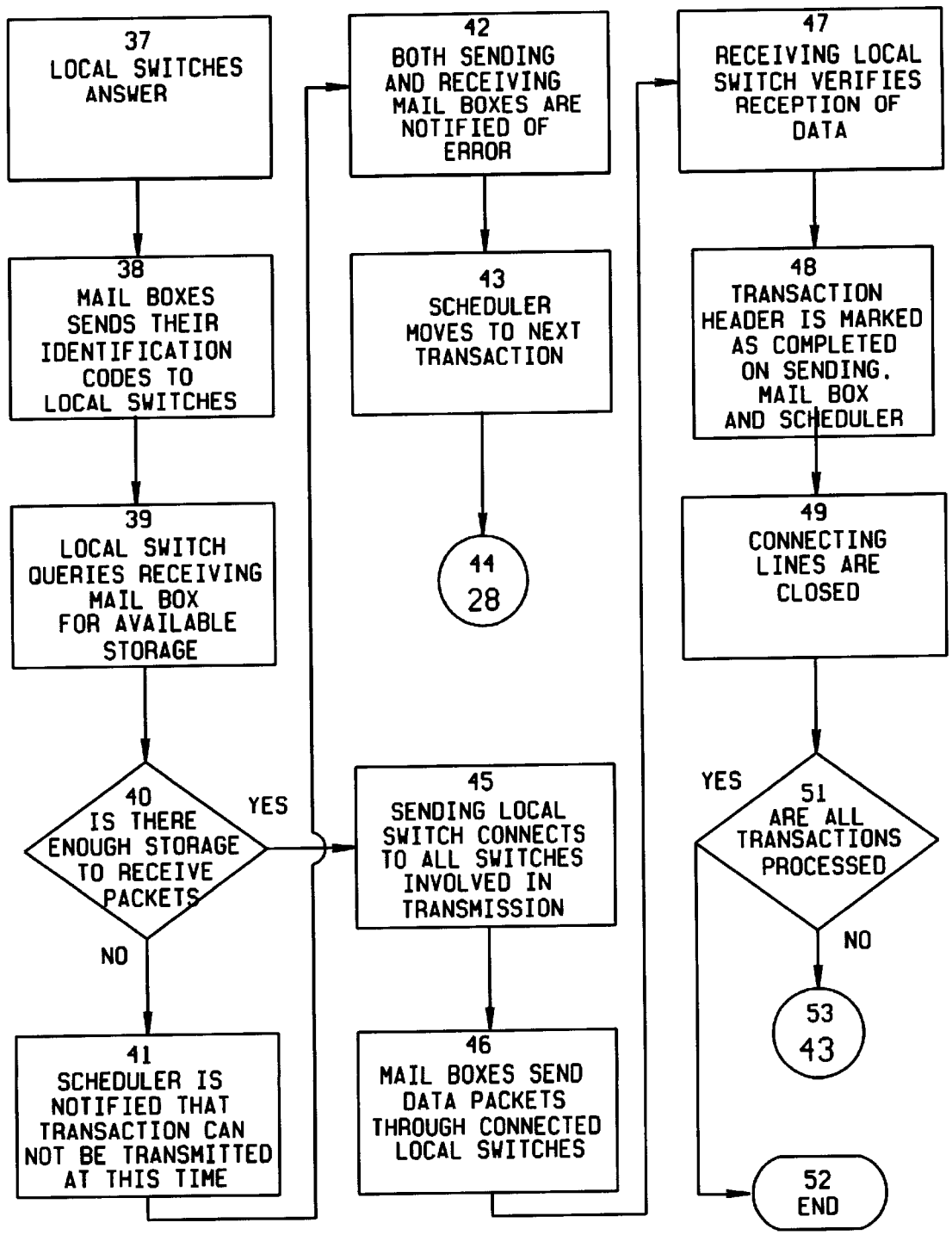

FIGS. 4A–4C shows a flow chart for the preferred operation of the system 10. As an illustration of the present system 10, the following is a description of a typical transaction.

Subscriber S is located in Los Angeles, California. S wants to send a photograph containing confidential matter to subscriber R, located in New York, N.Y. Attached to his personal computer, S has a scanner. S scans the photograph and saves the resulting image as a file on his local hard drive. Using the front end software, S enters the identification number for R and selects the image file to be sent, possibly using a graphical user interface to make the selection. The software may be designed to scan the file for viruses at this point. The software then sends the file and addressee information to the mailbox 16S.

The mailbox 16S preferably compresses and encrypts the file at this point, though either or both steps may be omitted. The mailbox 16S should also calculate a checksum to add to the header for error detection. The mailbox 16S then prepares a header containing information about the transaction, and prepends the header to the file. A typical header format is shown in Table 1. Some fields of the header are naturally left blank at this point, such as transmission time.

S should have his "smart card" in the card reader 66 of his mailbox 16S before sending the file to the mailbox 16S. If the front end software has a password associated with S, this must also be entered at this time. After the file is transferred to the mailbox 16S, mailbox 16S, using the modem thereof, calls the local switch 12S. The telephone number therefor is retrieved from S's "smart card."

TABLE 1

| Field | Size (bytes) |
| --- | --- |
| Type Code | 7 |
| Initial Received Date/Time | 12 |
| Transmission Date/Time | 12 |
| Received Date/Time | 12 |
| Priority Code | 1 |
| Sender's Identification | 8 |
| Sender's Name | 24 |
| Sender's Mailbox Identification | 8 |
| Sender's Network Switch | 6 |
| Addressee's Identification | 8 |
| Addressee's Mailbox Identification | 8 |
| Addressee's Network Switch | 6 |
| Byte Count | 12 |
| Check Sum | 12 |
| User Password | 15 |
| Transaction Status | 1 |
| Transaction Number | 12 |
| File Name | 15 |
| File Pointer | 4 |
| TOTAL | 183 |

When switch 12S answers, mailbox 16S sends the unique identification number therefor and disconnects. The controller computer 20S for switch 12S looks up the telephone number for mailbox 16S based on the unique identification number therefor. The switch 12S then calls back the mailbox 16S, at which time mailbox 16S sends the header to the switch 12S. If the recipient (addressee) also uses the same local switch 12S, the switch 12S will schedule the transfer without the aid of the network scheduler. However, when the recipient is not local to the same switch as the sender, as in this example, the controller computer 20S forwards the send request to the network scheduler 22. The network scheduler 22 continuously polls all controller computers 20 for outstanding send requests. Only when polled by the network scheduler 22, does the controller computer 20S actually forward the send request.

The network scheduler 22 maintains a database of each mailbox 16 and the times when transactions are to occur. When a switch 12 is capable of scheduling a transaction without the network scheduler 22, the network scheduler 22 must still be notified to keep the database current. For most systems, only one network scheduler 22 will be required for the entire system. If the system is extremely large, multiple network schedulers 22 may be needed on a regional, national, or continental basis. In this example, only one network scheduler 22 exists, and is located in a geographically central basis such as Columbia, Mo. When the network scheduler 22 has calculated a viable time for the transaction, it notifies the controller computers 20S and 20R for the switches 12S and 12R to be involved. Switch 12R and controller computer 20R are located in the same vicinity as the recipient, in this case New York.

At the time appointed by the network scheduler 22, switch 12S opens a virtual circuit to switch 12R, using a route (selected by the network scheduler) through switches 12A, 12B, and 12C, all of which are interconnected using T-1 (DS1 speed) digital lines. Switches 12S and 12R call mailboxes 16S and 16R respectively. The mailboxes 16S and 16R are notified of the impending transfer and mailbox 16R is queried as to whether it has enough free storage space for the transfer. If mailbox 16R does not have the requisite space, the network scheduler 22 is notified that the transaction must be rescheduled.

Mailboxes 16S and 16R disconnect from switches 12S and 12R respectively. The mailboxes 16S and 16R now call back the switches 12S and 12R. Optionally, two separate telephone numbers may be used for header transfers file transfers. If two such telephone numbers are used, mailboxes 16S and 16R uses the file transfer telephone number at this point. Upon connection, the mailboxes 16S and 16R send their unique identification numbers and disconnect. The switches 12S and 12R verify the identities of mailboxes 16S and 16R respectively, and call back at the designated telephone numbers.

Once both mailboxes 16S and 16R are connected to the switches, the file is transferred. The data flows directly from mailbox 16S, without interruption through switches 12S, 12A, 12B, 12C, and 12R (over the T-1 lines), and over the telephone lines in New York to mailbox 16R.

The mailbox 16R calculates the checksum of the file and verifies that the calculated checksum matches the checksum shown in the header. If a discrepancy occurs, an error message is generated and the transaction rescheduled. Assuming the transfer took place correctly, the transaction is over, the mailboxes 16S and 16R disconnect, and the virtual circuit through the switches 12 is closed. The file is decrypted and uncompressed if necessary, and stored on the HDD 44 of mailbox 16R. The mailbox 16R should notify the subscriber, R, the a file has arrived. It may do so by means of a flashing light 68 on the front panel.

Subscriber R may now insert his "smart card" into the card reader 66 of mailbox 16R, and use the front end software to retrieve the file. Any necessary password must also be entered. A computer virus scanner may also be included in the software for use at the retrieval stage.

While the foregoing is directed to the preferred embodiments of the present invention, other and further embodiments of the invention may be devised without departing from the basic scope thereof, and the scope thereof is determined by the claims which follow.

What is claimed is:

1. A data communication system for transferring digital data between a sending mailbox and a receiving mailbox without simultaneously connecting said mailboxes, said system comprising:

a first mailbox adapted to collect digital data from a sending mailbox, said first mailbox including a housing, a processor, a memory, a data storage means, a non-volatile memory with a first unique identification, a clock, an alarm and a modem;

a second mailbox adapted to transfer digital data to a receiving mailbox, said second mailbox including a housing, a processor, a memory, a data storage means, a non-volatile memory with a second unique identification, a clock, an alarm and a modem;

a data transferring network adapted to connect said first and second mailboxes through the respective modems thereof; and, a network scheduler connected to said network and to the first and second mailboxes, said network scheduler recognizing said first and second mailboxes by the unique identifications in their non-volatile memories, said network scheduler adapted to receive send requests from said first mailbox to send data to said second mailbox and to forward notification to said first and second mailboxes when data from said first mailbox should be transferred to said second mailbox through said network.

2. The data communication system of claim 1, further comprising a plurality of said receiving mailboxes.

3. The data communication system of claim 1, wherein said network includes a plurality of interconnected switches accessible from the modems of said sending and receiving mailboxes via a public telephone system.

4. The data communication system of claim 3, wherein one said switch receives said send requests and forwards same to said network scheduler, and at least one said switch, including said switch which received said send requests, receives said notification from said network scheduler and forwards same to said sending and receiving mailboxes.

5. The data communication system of claim 4, wherein said sending and receiving mailboxes are programmed to disconnect from said switches upon receiving said notification and to subsequently call back the switches disconnected therefrom, to verify the identities thereof.

6. The data communication system of claim 4, wherein said switches are programmed to disconnect said sending mailbox upon receiving a send request and to subsequently call back said sending mailbox to verify the identity thereof.

7. The data communication system of claim 6, wherein said sending mailbox is programmed to send a header containing information regarding the nature of a send request only after said switch disconnects therefrom and subsequently calls back.

8. The data communication system of claim 3, wherein said switches are interconnected by at least DS1 speed digital transmission lines.

9. The data communication system of claim 3, wherein said switches are interconnected by a combination of at least DS1 speed digital transmission lines and satellite links.

10. The data communication system of claim 1, wherein said sending mailbox encrypts said data upon transmission thereof to said receiving mailbox, and said receiving mailbox decrypts said data upon reception thereof.

11. The data communication system of claim 1, wherein said sending mailbox compresses said data upon transmission thereof to said receiving mailbox, and said receiving mailbox uncompresses said data upon reception thereof.

12. The data communication system of claim 1, further comprising a first interface integrated with said sending mailbox for collecting said data from a sending user's personal mailbox, and a second interface integrated with said receiving mailbox for disseminating said data to a receiving user's personal mailbox.

13. The data communication system of claim 1, further comprising signaling means integrated with said receiving mailbox for notifying the recipient of the arrival of said data.

14. The data communication system of claim 13, wherein said signaling means includes a light on the housing of said receiving mailbox.

15. The data communication system of claim 1, wherein said data storage means includes a hard disk drive.

16. The data communication system of claim 1, further comprising a plurality of identification devices possessed by users of said sending and receiving mailboxes, said mailboxes adapted to receive said identification devices, calculate the validity thereof, and function only when in receipt of a valid identification device.

17. The data communication system of claim 16, wherein said identification devices comprise a credit-card-sized base and a semiconductor chip imbedded therein.

18. The data communication system of claim 17, wherein said identification devices further comprises a fingerprint scanner.

19. A data communication system comprising:
   a sending mailbox adapted to collect digital data from one or more sources, said sending mailbox including a processor, volatile and non-volatile memories, data storage means, a modem, and a unique identification number permanently stored in the non-volatile memory thereof;
   a receiving mailbox adapted to receive digital data transferred from said sending mailbox, said receiving mailbox including a processor, volatile and non-volatile memories, data storage means, a modem, and a unique identification number permanently stored in the non-volatile memory thereof; and
   a switch connected to said sending and receiving mailboxes by means of a public telephone network, and including a memory in which is stored a lookup table of identification numbers and telephone numbers corresponding to said identification numbers;
   wherein said sending mailbox connects by modem to said switch at a predetermined telephone number, transfers to said switch its unique identification number, a request to send the digital data to said receiving mailbox, and the unique identification number of said receiving mailbox, after which said sending mailbox terminates the connection;
   wherein said switch connects to said sending mailbox at the telephone number corresponding to said sending identification number contained in said lookup table, verifies the identification of said sending mailbox, and terminates the connection;
   wherein said switch connects to said sending and receiving mailboxes at the telephone numbers corresponding to said sending and receiving identification numbers contained in said lookup table, respectively, notifies said sending and receiving mailboxes that the data should be transferred, and terminates the connection; and
   wherein said sending and receiving mailboxes connect to said switch at a predetermined telephone number, thereafter said sending mailbox transfers the digital data to said receiving mailbox through said switch.

20. The data communication system of claim 19, further comprising a plurality of said receiving mailboxes.

21. The data communication system of claim 19, further comprising a plurality of said switches interconnected with one another.

22. The data communication system of claim 21, wherein said switches are interconnected by at least DS1 speed digital transmission lines.

23. The data communication system of claim 21, wherein said switches are interconnected by a combination of at least DS1 speed digital transmission lines and satellite links.

24. The data communication system of claim 19, wherein said sending mailbox is programmed to send a header containing information regarding the nature of a send request only after said switch has verified the identity of said sending mailbox.

25. The data communication system of claim 19, further comprising a network scheduler, said network scheduler adapted to receive send requests from said switches and to notify said switches when said data should be transferred.

26. The data communication system of claim 19, wherein said sending mailbox encrypts said data upon transmission thereof to said receiving mailbox, and said receiving mailbox decrypts said data upon reception thereof.

27. The data communication system of claim 19, wherein said sending mailbox compresses said data upon transmission thereof to said receiving mailbox, and said receiving mailbox decompresses said data upon reception thereof.

28. The data communication system of claim 19, further comprising a first interface associated with said sending mailbox for collecting said data from a sending user's personal computer, and a second interface associated with said receiving mailbox for disseminating said data to a receiving user's personal computer.

29. The data communication system of claim 19, further comprising signaling means integrated with said receiving mailbox for notifying a recipient of the arrival of said data.

30. The data communication system of claim 29, wherein said signaling means includes a light on the housing of said receiving mailbox.

31. The data communication system of claim 19, wherein said data storage means includes a hard disk drive.

32. The data communication system of claim 19, further comprising a plurality of identification devices possessed by users of said sending and receiving mailboxes, said mailboxes adapted to receive said identification devices, calculate the validity thereof, and function only when in receipt of a valid identification device.

33. The data communication system of claim 32, wherein said identification devices comprise a credit-card-sized base and a semiconductor chip imbedded therein.

34. The data communication system of claim 33, wherein said identification devices further comprises a fingerprint scanner.

35. A method of transferring digital data, the steps comprising:
   placing unique identification numbers in non-volatile memories of a plurality of mailboxes;
   providing a modem for each said mailbox;
   distributing said mailboxes to a plurality of locations, including one said mailbox at a point of origin of digital data to be transferred and one said mailbox at a destination thereof;
   providing a switch accessible by public telephone lines;
   placing the telephone number of said switch in the memory of each said mailbox;
   calling said switch from said originating mailbox;
   identifying said originating mailbox to said switch;
   disconnecting said switch from said originating mailbox and calling back said originating mailbox from said switch;
   transmitting a header to said switch from said originating mailbox, said header containing information about said destination mailbox and the data to be transferred;
   disconnecting said switch from said originating mailbox;
   calling said originating mailbox and said destination mailbox from said switch;
   notifying said originating mailbox and said destination mailbox of an impending transfer;

disconnecting said switch from said originating mailbox and said destination mailbox;

transferring the data from said originating mailbox to said destination mailbox through said switch; and disconnecting said switch from said originating mailbox and said destination mailbox.

36. The method of claim 35, further comprising the step of inserting a first user identification device in a receptacle of said originating mailbox provided therefor, before said transmission of said header, and inserting a second user identification device in a receptacle of said destination mailbox provided therefor, after transfer of the data.

37. The method of claim 36, wherein said user identification device comprises a credit-card-sized base and semiconductor chip embedded therein.

38. The method of claim 35, further comprising the step of calculating a time to transfer said data when both originating and destination mailboxes are available.

39. The method of claim 35, further comprising the step of compressing said data upon transfer thereof.

40. The method of claim 35, further comprising the step of encrypting said data upon transfer thereof.

41. The method of claim 35, further comprising the steps of:

collecting said data in said originating mailbox from and through a connection with a sending user's personal computer;

storing said data temporarily on said originating mailbox until transfer thereof;

storing said data temporarily on said destination mailbox after transfer thereof; and disseminating said data from said destination mailbox to and through a connection with a receiving user's personal computer.

42. The method of claim 41, wherein said data is stored on hard disk drives.

* * * * *